United States Patent
Hanners

[11] Patent Number: 5,553,471
[45] Date of Patent: Sep. 10, 1996

[54] MOTORCYCLE CENTER STAND WITH LOCKING DEVICE

[76] Inventor: William D. Hanners, 4493 Hockmaple Ct., Concord, Calif. 94521

[21] Appl. No.: 453,873

[22] Filed: May 30, 1995

Related U.S. Application Data

[63] Continuation-in-part of Ser. No. 215,908, Mar. 22, 1994, abandoned.

[51] Int. Cl.$^6$ ................................................. B62H 5/00
[52] U.S. Cl. ........................ 70/235; 248/688; 280/297; 280/301
[58] Field of Search ................. 70/62, 233–235; 248/688; 280/297, 301

[56] References Cited

U.S. PATENT DOCUMENTS

| | | | |
|---|---|---|---|
| 947,379 | 1/1910 | Duve et al. | 70/235 |
| 1,062,744 | 5/1913 | Smith et al. | 70/235 X |
| 1,587,382 | 9/1926 | Kendal | 70/235 |
| 4,298,211 | 11/1981 | Shitamori | 70/235 X |
| 4,725,075 | 2/1988 | Biancardi | 280/297 X |
| 5,114,167 | 5/1992 | Shieh | 280/297 |

FOREIGN PATENT DOCUMENTS

| | | | |
|---|---|---|---|
| 771826 | 10/1934 | France | 70/235 |
| 1122433 | 9/1956 | France | 280/297 |
| 2598669 | 11/1987 | France | 70/235 |
| 3943266 | 7/1991 | Germany | 70/233 |
| 525618 | 5/1955 | Italy | 280/297 |
| 145288 | 5/1931 | Switzerland | 280/297 |
| 158107 | 1/1933 | Switzerland | 70/235 |
| 181143 | 2/1936 | Switzerland | 70/235 |
| 275671 | 8/1951 | Switzerland | 70/235 |
| 198843 | 6/1923 | United Kingdom | 70/235 |
| 445516 | 4/1936 | United Kingdom | 70/235 |
| 563484 | 8/1944 | United Kingdom | 70/235 |

*Primary Examiner*—Lloyd A. Gall
*Attorney, Agent, or Firm*—Bielen, Peterson & Lampe

[57] ABSTRACT

A locking mechanism for a two-wheeled motorcycle having a center stand; the locking mechanism in one embodiment including a key lock with a cylinder that is connected to a cam that displaces a locking pin to engage a pivotal sleeve that connects the center stand to the frame of the motorcycle such that when the lock is engaged, the pin extends to an aligned hole on the center stand when the center stand is displaced to its operable position. When the center stand is locked, the motorcycle cannot be moved. An embodiment includes a bracket unit for securement to a leg of the stand, having a pivotal detent arm and a lock for locking the detent arm in a locked position.

6 Claims, 2 Drawing Sheets

MOTORCYCLE CENTER STAND WITH LOCKING DEVICE

This application is a continuation-in-part of my application Ser. No. 08/215,908, filed 22 Mar. 1994 of the same title, now abandoned

BACKGROUND OF THE INVENTION

This invention relates to anti-theft equipment for a two wheeled motorcycle having a center stand. Theft of a motorcycle is a frequent occurrence because of its portability and ease of concealment.

Various means have been devised to prevent theft including chains threaded through the wheels and interconnected by a padlock, horseshoe shaped bars with a locking cross member and integral locking mechanisms that lock the front wheel fork in an off center position. As those intent on stealing a motorcycle become more sophisticated, these conventional means become less of a deterrent. Powerful bolt cutters can snap even a case hardened chain, small jacks can spring a horseshoe lock and a canted front wheel can still allow a motorcycle to be loaded into the back of a pickup truck on a ramp by an angled attack on the ramp with a lifting of the front wheel onto the bed of the truck.

Because motorcycles are becoming more expensive, and are often used off-the-road without licensing, they have become an increasing target for theft. A stolen motorcycle can frequently be wheeled from the scene by hand and loaded into a van or onto the back of a pickup truck, covered and spirited away with minimal chance of detection.

The primary object of this invention is to provide a locking device for a two wheel motorcycle that engages the manufacturer equipped center stand to lock the stand in a downward operational position such that it cannot be pivoted to its retracted position. A center stand on a motorcycle is a parking device having two spaced legs connected to the motorcycle frame for pivotal movement of the stand with respect to the frame. A tension spring biases the stand to the inoperable retracted position against the underside of the frame, such that it does not interfere with the operation of the motorcycle. In use, the stand is pivoted downwardly while the motorcycle is pulled backward when foot pads on the end of the legs engage the ground. An upward lift to the back of the motorcycle may be employed to enable the legs to pass a vertical orientation before contacting a stop on the frame. When positioned, the stand orients the motorcycle in a stable upright position with the rear wheel elevated slightly from the ground.

In this position, the motorcycle has a three point contact with the ground, the two legs of the stand and one wheel. When the stand is locked in this position, the motorcycle is virtually impossible to move. Since a modern motorcycle for highway use weighs at least three hundred pounds and often over five hundred or more pounds, lifting the entire vehicle is a difficult task. The operationally positioned center stand when locked in position, therefore becomes a ground anchor and an effective deterrent to theft.

SUMMARY OF THE INVENTION

The locking device for a two wheeled motorcycle of this invention comprises a locking mechanism that engages the center stand of the motorcycle and locks the stand in an operational position. In order to enable the center stand to be pivoted to its non operational position under the motorcycle frame, the locking mechanism must be unlocked. Once unlocked, the center stand operates in its customary manner.

A center stand for a motorcycle comprises a pair of spaced legs pivotally connected at one end to the frame. A cross member usually interconnects the spaced legs for added strength and stability and the distal ends of the legs include foot pads for distribution of weight on soft ground. The opposite ends of the legs are pivotally connected to the frame and usually include a cross sleeve mounted around a tubular cross brace on the frame allowing limited pivotal movement.

The locking mechanism is preferably key operated and is of two alternate types. In one embodiment, the locking mechanism is automatically engaged when the center stand is swung downwardly into its forward-vertical, operational position. The key is used to unlock the automatic locking mechanism and permit the center stand to be pivoted backwardly and up to its non-operational position. In the alternate embodiment, the center stand can be pivoted into its operational position without automatic engagement of the locking mechanism. The key must then be used to engage the locking mechanism to lock the center stand in position. This embodiment allows the motorcycle to be parked temporarily or at a secure location without engaging the locking mechanism unless intending to do so. Also, in the event the key is lost or misplaced, the center stand can be used without fear of inadvertently locking the motorcycle in place.

The locking mechanism is conventional in design with a tumbler cylinder having a tumbler assembly and one or more locking bolts in the form of cam displaceable pins that are actuated by the key and engage complementary recesses in the center stand structure to prevent pivotal movement of the stand. In the locking mechanism with automatic engagement, a locking pin can be spring loaded to automatically extend into the locking hole when the hole is aligned with the pin and the hole is unoccupied by a complementary unlocking pin.

These and other features of this invention will become apparent upon a detailed consideration of the preferred embodiments.

DETAILED DESCRIPTION OF THE PREFERRED EMBODIMENTS

Figure 1:
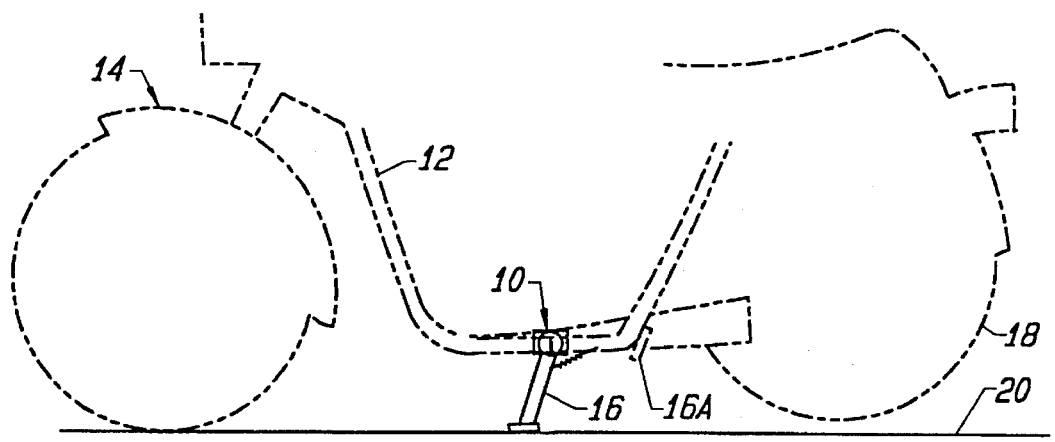
FIG. 1 is a side elevational view, partially schematic, of the center stand locking mechanism of this invention on a motorcycle.

The locking mechanism for a motorcycle center stand is shown in FIG. 1 and designated generally by the reference numeral 10. The locking mechanism 10 in the preferred embodiment is incorporated into the frame 12 of a typical motorcycle 14 shown schematically. The locking mechanism 10 engages a pivotal center stand 16 which is utilized to maintain the motorcycle in a vertical, upright position with at least one of the motorcycle wheels 18 raised slightly off of the ground 20. When the center stand 16 is locked in place, the motorcycle is unable to be rolled and must be lifted for movement. Given the substantial weight of the motorcycle, when the center stand is locked in the position shown in FIG. 1, the locking mechanism provides a substantial deterrent to theft.

Figure 2:
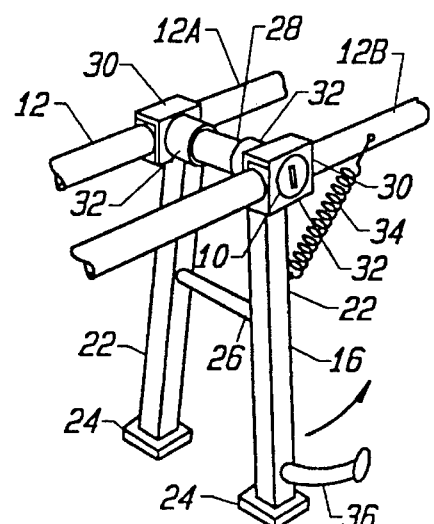
FIG. 2 is a partial perspective view of the locking mechanism, the center stand and a portion of the motorcycle frame.

Referring now to FIG. 2, a partial perspective view of the center stand 16 and a portion of the motorcycle frame 12 illustrates the implementation of the locking mechanism 10 into a typical frame construction having a center stand. It is to be understood that modifications of this arrangement may be required for different types of frames and center stands or when the locking mechanism is retro-fit to an existing motorcycle stand. A center stand 16 is typically constructed with two spaced legs 22 having a foot pad 24 at their distal ends with a cross brace 26 for added stability. The legs 22 are pivotally connected to the frame 12 and rotatable on a tubular cross brace 28. The tubular frame 12 and cross brace 28 interconnect at a junction block 30. In the embodiment shown in FIG. 2, the legs 22 of the center stand 16 are welded to sleeves 32 which encompass the cross brace 28 and allows limited pivotal movement of the stand 16. In this manner, the center stand 16 can be pivoted in the direction shown by the indicator arrow in FIG. 2 to a tucked position between the frame members 12A and 12B such that the center stand 16 assumes the substantially horizontal, out-of-the-way position as shown by the alternately positioned center stand 16A in FIG. 1. In this position, the center stand does not interfere with the operation of the motorcycle during use.

To bias the stand in the retracted position as shown in 16A, a tension spring 34 is connected between the frame member 12B and one of the legs 22 of the center stand 16. When the center stand is to be used, the stand 16 is pivoted down to the ground by the rider who positions the stand using his foot against an extension peg 36. Upon contact with the ground, the motorcycle is pulled backward such that the center stand passes beyond a vertical position to the forwardly angled positioned as shown in FIG. 1. The tension spring 34 is stretched, but is insufficient to retract the center stand 16 when the center stand 16 is located in the operable position.

Figure 3:
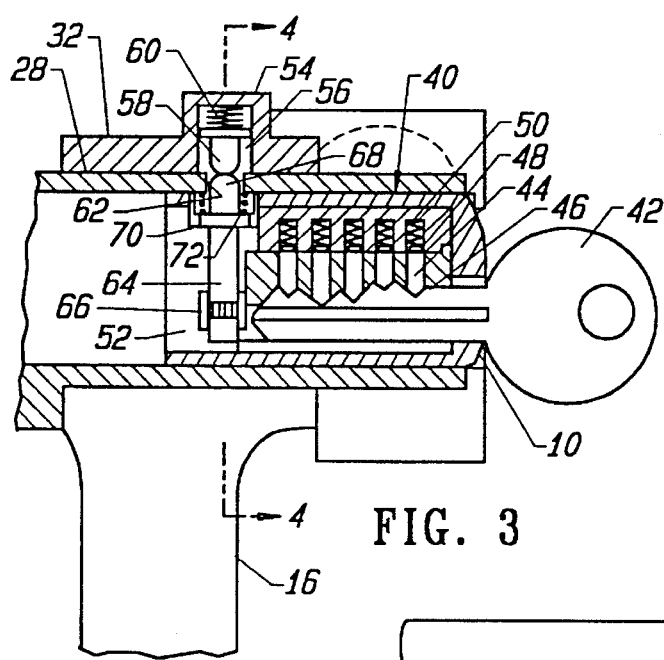
FIG. 3 is an enlarged cross sectional view of the locking mechanism and a portion of the center stand.

Referring now the enlarged, cross-sectional view of FIG. 3, the detail of the locking mechanism 10 is illustrated. The locking mechanism in the preferred embodiment utilizes a standard cylinder lock 40 that is operated with a cylinder lock key 42. For purposes of illustration, the locking mechanism 10 is oriented in its unlocked position and by turning the key one quarter of a turn in either direction, the locking mechanism is altered to its locked or activated state. The cylinder lock 40 includes a rotatable cylinder 43 with a series of pins 44 that are sized to conform with the notches 46 in the key 42 such that when the proper key 42 is inserted in the lock 40, the pins are positioned with ends flush with the surface of the cylinder 43. In this position, detents 48 that are biased by compression springs 50 cannot enter the holes for the pins 44 and prevent the cylinder from rotating. With the pins 44 flushed with the surface of the cylinder 43, the cylinder can be rotated by twisting with the key 42.

The housing 52 for the cylinder lock 40 is encased within the cross brace 28 of the motorcycle frame 12 and secured by welding or by other tamper proof means. As noted, the center stand 16 is connected to the cross brace 28 by sleeves 32. In the embodiment of FIG. 3, one sleeve 32 includes a locking pin housing 54 having a bore 56 in which is slidably positioned a locking pin 58. The locking pin 58 is biassed toward the tubular cross brace 28 by a compression spring 60. When the center stand 16 is pivoted to its operable position as shown in FIG. 1, the locking pin 58 aligns with a locking hole 62 in the cross brace 28.

Normally, the locking pin 58 would be displaced by the spring 60 to enter the locking hole 62 and prevent rotation of the center stand 16 on the cross brace 28. However, on orientation of the locking key 42 to the vertical position as shown in FIG. 3, the cylinder 43 positions a cam 64 fastened to the end of the cylinder 43 by a rivet 66 such that a complementary unlocking pin 68 mounted in the lock housing 52 is positioned into the locking hole 62 to block insertion of the locking pin into the locking hole 62. The unlocking pin 68 is trapped in a small pin cap 70 fixed to the lock housing 52 and biassed against the cam 64 by a compression spring 72. In effect, the locking elements for locking the center stand 16 to the cross brace 28 operates in a manner similar to the tumbler pins in the cylinder lock 40.

Figures 4, 5:
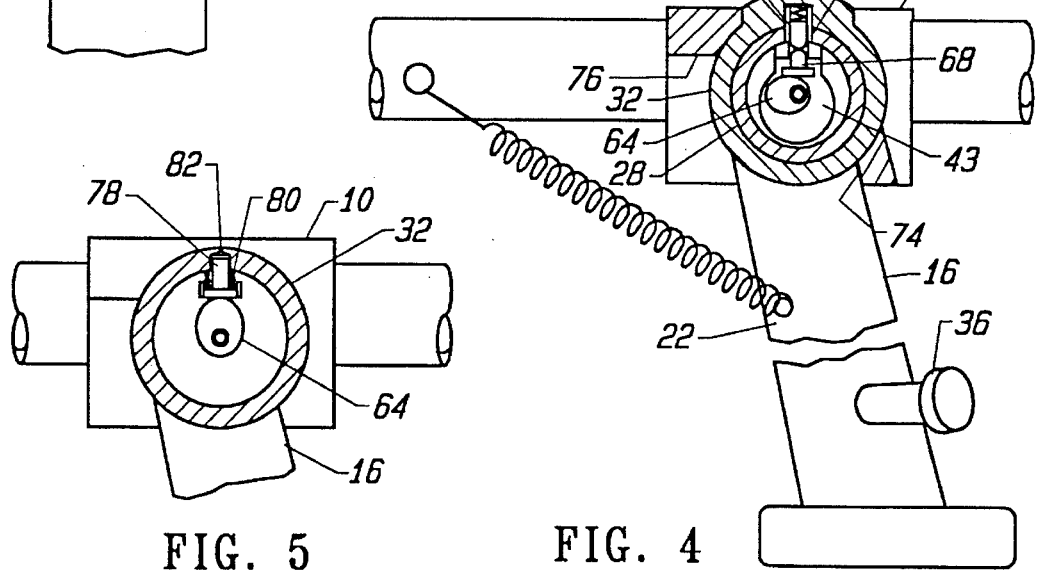
FIG. 4 is a cross sectional view taken on the lines 4—4 in FIG. 3.
FIG. 5 is a cross sectional view of an alternate embodiment of the locking mechanism of FIG. 4.

Referring to the cross sectional view of FIG. 4, the cam 64 is shown turned one quarter turn from the position of FIG. 3. In this position, the unlocking pin 68 is retracted allowing the locking pin 58 to enter the locking hole 62 and prevent pivotal movement of the sleeve 32 of the center stand 16 on the cross brace 28. As shown, the representative leg 22 of the center stand 16 is positioned past vertical and contacts a stop 74 on the junction block 30. When pivoted to the non-operational position, the leg 22 will contact a similar stop 76 on the junction block 30 for operational use of the motorcycle.

It can be understood that the preferred locking mechanism as described in FIGS. 3 and 4 enables the locking mechanism to be automatically engaged when the cylinder 43 is left in its position as shown in FIG. 4 when the center stand is in its non-operational location. In this position, when the center stand 16 is pivoted to its operational position, the locking pin 58, biassed by its compression spring 60, will be forced into the locking hole 62 when the pin and hole are aligned. Alternately, if the cam 64 is positioned in the orientation shown in FIG. 3, the pin hole will be blocked by the unlocking pin 68 and the center stand 16 will not automatically lock when pivoted to its operational position.

Referring now to the alternate embodiment of the locking mechanism 10 shown in FIG. 5, the locking mechanism is constructed in substantially the same manner as the mechanisms shown in FIGS. 3 and 4. In the embodiment of FIG. 5, however, the use of a locking pin housed within the connecting sleeve 32 is omitted. In this embodiment, the cam 64 engages an extended locking pin 78 that is biassed against the cam 64 by a similar compression spring 80. The extended pin 78 is sufficiently long to engage a blind bore 82 in the connecting sleeve 32 of the center stand 16.

In this embodiment, the center stand 16 is not automatically locked, but must be first positioned in its operational position before the key can actuate the cylinder lock 40 and extend the locking pin 78 into the blind bore 82. To unlock this mechanism, the key is again inserted and the tumbler cylinder 43 turned a quarter turn to allow retraction of the locking pin 78. Although a locking mechanism with a single locking bolt in the form of a cylindrical locking pin is shown, by proper configuration and arrangement of the cam, multiple pins can be used. Additionally, it is to be understood that the preferred cylindrical locking pin can be replaced with other configurations of a typical locking bolt used with locking mechanisms, and may have square or other forms of cross section as is known in the field. While it is to be understood that different locking mechanisms may be utilized to perform the task of locking the center stand of a motorcycle in its operational position, the embodiments disclosed provide a relatively tamper proof method of securing a motorcycle. To prevent access to the locking mechanism, the housing of the locking mechanism should be of hardened steel. Furthermore, to prevent the center stand 16 from being cut by a hack saw, the center stand should also be of hardened steel. The parts and construction of the locking mechanism should be of sufficient strength and durability to make it more difficult to disengage the locking mechanism than to lift the entire vehicle, which is the other alternative to a perspective thief. It is also to be understood that with minor modifications in construction and arrangement, the locking mechanism can be equipped with an external housing that is secured to a center stand for adapting the locking mechanism to preexisting motorcycle stands as a retro-fit kit. Preferably, the locking mechanism should be so located and housed as to be welded to the preexisting structure to inhibit tampering.

Figures 6, 7, 8:
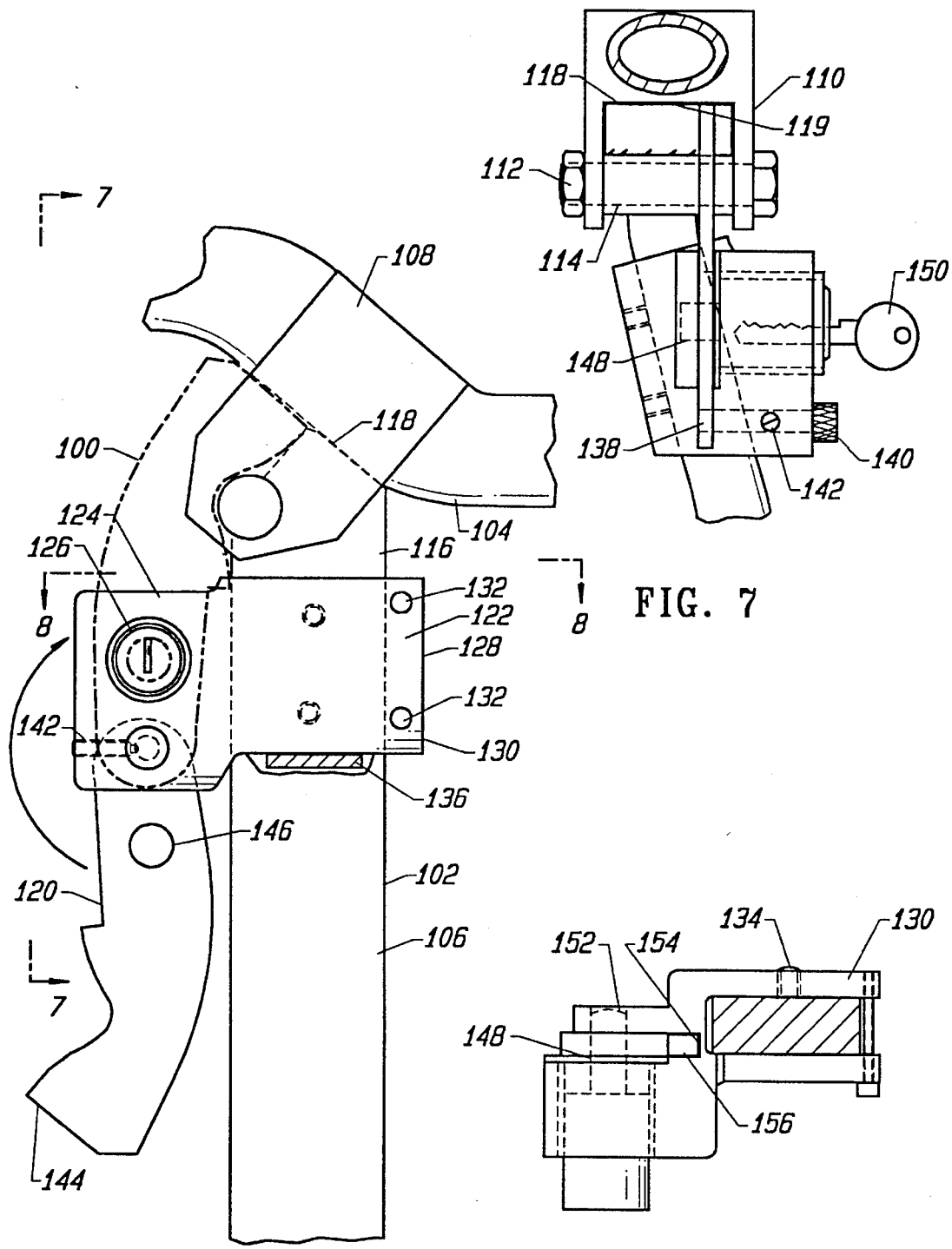
FIG. 6 is a side elevational view of a locking mechanism with the detent arm in an unlock position.
FIG. 7 is an end view taken on the lines 7—7 in FIG. 6 with the detent arm in a lock position.
FIG. 8 is a cross-sectional view taken on the lines 8—8 in FIG. 6.

Referring now to the side view of FIG. 6, a locking mechanism, designated by the reference numeral 100 is shown connected to the pivotal center stand 102 of a motorcycle frame 104 only a portion of which is shown. With minor modifications, the locking mechanism 100 can be adapted to a variety of different existing models of motorcycles. Because the locking mechanism 100 is an add-on accessory, the minor difference in size and configuration will be required for different models and makes of motorcycles. The locking mechanism 100 can be adapted to many motorcycles having a single leg stand as well as a dual leg center stand.

In FIGS. 6–8, a single leg 106 of a center stand of the type in FIG. 2 is illustrated. The frame of FIG. 6 includes a coupling block 108 that includes a pair of bracket elements 110 which are interconnected by a bolt 112. The bolt 112 functions as a pivot pin for a sleeve 114 to which the top end 116 of the stand leg 106 is fixed by welding. The top 116 of the leg 106 includes a flat contact face 118 which contacts a stop 119 in the coupling block 108 when the stand 102 is in the upright position as shown in FIG. 6. This limits further movement of the stand in the downward direction and permits retraction by clockwise rotation about the pin 112 which functions as a pivot.

The locking mechanism 100 prevents retraction of the stand 102 by positioning a detent arm 120 from a disengaged position shown in FIG. 6 to a wedge position in the coupling block 108 as shown in phantom in FIG. 6. The detent arm 120 is pivotally mounted on a bracket unit 122 that includes a housing portion 124 for a plunge lock 126, and a bracket portion 128 for connecting the bracket unit to one leg of the motorcycle stand. The bracket portion 128 includes a pair of bracket members 130 that extend on each side of the stand leg 106 and are clamped thereto by a pair of bolts 132. Additionally, a pair of set screws 134 insure that the position of the bracket unit 122 is maintained on the leg 106 of the motorcycle stand 102. Where it is desired to permanently affix the bracket unit 122 to the stand 102, the bracket unit 122 can be welded with a junction weld 136 as shown in FIG. 6.

The housing portion 124 of the bracket unit 122 includes a pivot pin 138 through the housing portion 124 that is fixed to the detent arm 120. A twist knob 140 at the opposite end of the pin 138 enables the detent arm 120 to be easily rotated into or out of locking position when locking or unlocking the stand. To prevent the detent arm 120 from vibrating during the unlocked position during operation of the motorcycle, a spring loaded ball detent 142 engages a dimple (not visible) in the pivot pin 138 for maintaining the suspended position of the detent arm 120 in the unlocked position. The detent arm 120 includes a distal end 144 that wedges between the stop 119 of the coupling block 108 and the leg sleeve 114 at the top end 116 of the stand leg.

The detent arm 120 includes a hole 146 which aligns with a locking pin 148 that is part of the plunge lock 126. Upon turning a key 150, the plunge lock 126 moves into a locking position in the housing portion 124 as shown in FIG. 7 moving the pin into a catch 152 in the bracket unit 122. When the detent arm 120 is moved into the locking position wedged between pivot pin 112 and coupling block 108, as shown in FIG. 7 and in phantom in FIG. 6, the pin 148 passes through the hole 146 before engaging the catch 152. The use of a catch 152 in conjunction with a close tolerant key way 154 into which a portion 156 of the detent arm 120 is inserted relieves the push lock from excess stress forces in the event that movement of the stand is attempted while in the locked position. When the plunge lock is unlocked, the plunge lock is displaced withdrawing the pin from engagement with the detent arm 120 as shown in FIG. 8. Preferably, the plunge lock is of the type that can be engaged without the use of a key, by pressing the lock into the housing portion 124 of the bracket unit 122. As noted, the locking mechanism 100 is utilized on one leg of a motorcycle stand, and therefore is easily adapted to a single leg stand having a similar type of pivotal connection to the motorcycle stand.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A locking mechanism for a motorcycle stand of a motorcycle, the motorcycle having a frame with a coupling block and a center stand for supporting the motorcycle in an upright position when the center stand is downwardly pivoted from a substantially horizontal retraceted position to a substantially vertically operable position, with at least one leg of the stand pivotally connected to the coupling block, the block having a stop limiting pivotal displacement of the leg with the coupling block having bracket elements with a pivot pin and the leg having a sleeve pivotally engageable with the pivot pin for limited displacement of the leg from a downward support position to an upward retracted position, the locking mechanism comprising:

a bracket unit having a housing portion and a bracket portion with bracket means for securing the bracket unit to the leg of the motorcycle stand, a detent arm with pivot means for pivotally connecting the detent arm to the housing portion of the bracket unit, the detent arm being pivotal between a lock position and an unlock position and having a distal end outside of the bracket unit engageable with the stop of the coupling block when pivoted into the lock position; and, locking means in the housing portion of the bracket unit for locking the detent arm in the lock position.

2. The locking mechanism of claim 1 wherein the detent arm has manual means for pivoting the detent arm between the lock position and the unlock position.

3. The locking mechanism of claim 2 wherein the manual means comprises a twist knob.

4. The locking mechanism of claim 1 wherein the pivot means of the detent arm comprises a pin secured to the detent arm pivotally engaged with the bracket unit.

5. The locking mechanism of claim 4 wherein the housing portion of the bracket unit includes detent means for releasibly holding the detent arm in the unlock position.

6. The locking mechanism of claim 5 wherein the locking means comprises a plunge lock with a displaceable pin engageable with the detent arm in the lock position to prevent pivoting of the detent arm.

* * * * *